Figure 1:
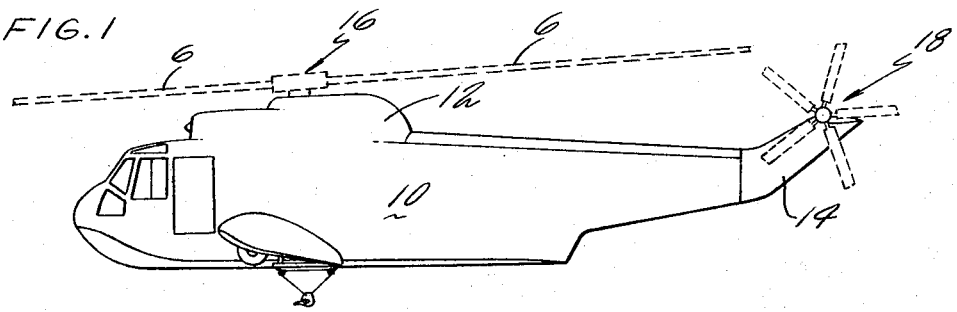

Aug. 9, 1966  J. H. PETERSON  3,265,336

CARGO SLING FOR AIRCRAFT

Filed May 13, 1964

INVENTOR
JOHN H. PETERSON
BY Jack N. M. Carthy
AGENT

United States Patent Office 3,265,336
Patented August 9, 1966

3,265,336
CARGO SLING FOR AIRCRAFT
John H. Peterson, Trumbull, Conn., assignor to United Aircraft Corporation, East Hartford, Conn., a corporation of Delaware
Filed May 13, 1964, Ser. No. 366,953
12 Claims. (Cl. 244—118)

This invention relates to a cargo sling for aircraft, and particularly for helicopters.

It is an object of this invention to provide means for suspending a cargo from an aircraft while keeping undesirable feedback forces to a minimum.

Another object of this invention is to provide a cargo sling which will furnish a load with freedom to oscillate while retaining a more constant load at each hard point connection to an aircraft.

A further object of this invention is to provide a cargo sling for an aircraft which will provide some lift-tow capability during ground tow and air tow.

Another object of this invention is to provide a cargo sling which will not interfere with the landing of a helicopter.

A further object of this invention is to provide a cargo sling which requires a minimum of stowage procedure and devices.

It is a further object of this invention to provide a cargo sling having four hard points forming a square at which each point a pulley would be attached; the pulleys being each attached by a universal joint with one cable being mounted on each pair of diagonal pulleys with the free ends being attached to a single hook device.

Another object of this invention is to provide a cargo sling which will tend to eliminate undersirable aircraft responses therefrom.

These and other objects and advantages of the invention will be pointed out in connection with the following detailed description of the drawings in which one embodiment is illustrated.

Figure 2:
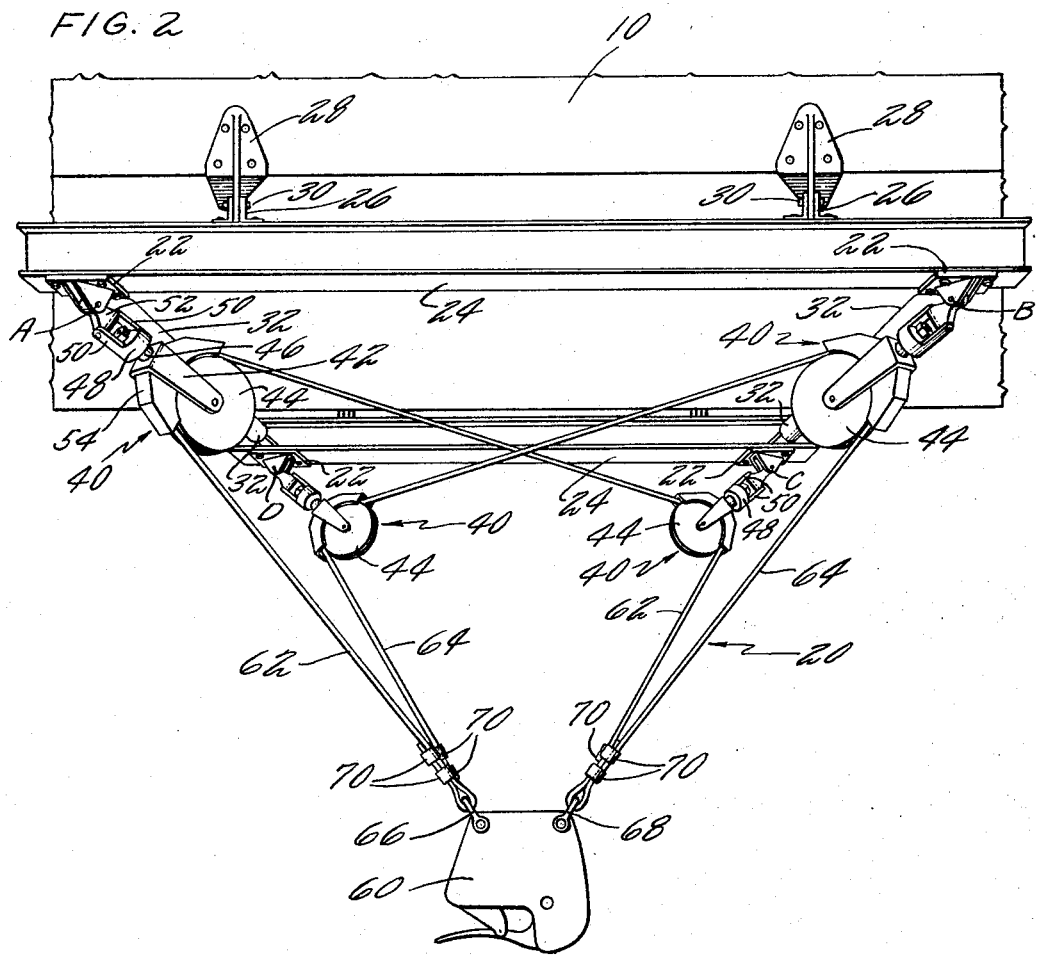

In the drawings:

FIGURE 1 is a side elevational view of a helicopter with the location of the cargo sling being shown beneath the helicopter; and FIGURE 2 is an enlarged view of the cargo sling.

Referring to FIG. 1, the helicopter on which the invention is shown comprises essentially an elongated fuselage 10 having a main rotor pylon 12 and a tail rotor pylon 14 on which are mounted the main rotor generally indicated at 16 and a tail rotor generally indicated at 18. The main rotor 16 comprises a rotor head having rotor blades 6 mounted thereon for pitch changing movement. A helicopter of this type is shown in U.S. application Serial No. 171,331, filed February 2, 1962, now Patent No. 3,199,601.

Referring to FIG. 2, the cargo sling 20 is supported by four hard points fixed with respect to the helicopter, A, B, C and D. These hard points are arranged in a square. A bracket 22 is positioned at each of these points having a bifurcated portion extending in line with the center of the square formed by the brackets.

The brackets 22 are shown positioned in the following manner. I-beams 24 are fixed on each side of the bottom of the helicopter extending longitudinally therewith and having a length greater than the width at which the brackets 22 are to be placed. Each I-beam 24 is fixed to rigid points on each side of the helicopter by sets of cooperating brackets 26 and 28. While these brackets are connected to hard points on the helicopter they are not arranged in a square. A hard point is a point which has been structurally made of such strength so as to support a given weight. The brackets 26 connected to each I-beam comprise flanges extending outwardly which receive a flange on each cooperating bracket 28 connected to the aircraft. These are held together by pins or bolts 30. Rods 32 extend laterally between the I-beams 24 at the locations of the brackets 22 to rigidly fix the points A, B, C and D.

A pulley unit 40 is attached to each of the brackets 22. Each pulley unit 40 consists of a fork having two extending arms 42 with a sheave or grooved wheel 44 pivotally mounted between the free ends of the arms 42 of the fork. A shaft 46 extends away from the base of the fork in a direction opposite from that of the extending arms. This shaft is mounted for rotation and small universal movement in the lower section of a connecting unit 48 by a cooperating ball and socket arrangement. Each connection unit 48 has a pair of ears 50 extending upwardly from the top thereof. A universal connecting unit 52 is located between each bracket 22 and each connecting unit 48. The ears 50 are pivotally connected to the connecting unit 52 at an angle of 90° to the axis at which the connecting unit 52 is attached to the bracket 22 between its bifurcated portion to provide a universal joint. A cover 54 is attached to the fork and covers the portion of the wheel adjacent its connection.

A cargo hook device 60 is supported by the cargo sling 20 by cables 62 and 64. Cables 62 and 64 are slightly different in length. The reason for this is the difference in height between each pair of diagonal pulleys. One pair of diagonal pulleys is located lower than the other pair so that the cables will not rub where they cross. Cable 62 extends over pulley 44 of the pulley unit 40 connected to hard point A and over the pulley 44 of the diagonally opposed pulley unit 40 connected to hard point C. Cable 64 extends over the pulley 44 of the pulley unit 40 connected to hard point B and over the pulley 44 of the diagonally opposed pulley unit 40 attached to hard point D. The cargo hook device 60 has a shackle 66 pivotally mounted to its upper forward end and, spaced therefrom, a shackle 68 pivotally mounted to its upper rearward end.

The free ends of cables 62 and 64 passing over the pulleys of the pulley units attached to hard points A and D are fixedly attached to the shackle 66. The free ends of cables 62 and 64 passing over the pulleys of the pulley units attached to hard points B and C are fixedly attached to the shackle 68. These attachments can be done by any known means. In FIG. 2, each free end is shown as extending through the shackle and clamped to itself by two clamps 70.

The cargo hook device can be remotely controlled, for example by electrical means or mechanical means.

The cable pulley suspension of the hook permits an elliptical path to be adhered to when the hook is displaced from neutral or zero swing position. The load line of action reacts on a perpendicular to the tangent at any point on this elliptical path. In the configuration shown, the shackles or suspension rings 66 and 68 on the hook were spaced or located eight inches apart when tested. This dimension directly aids the hook in adhering to its elliptical path. This dimension is most influential when the hook is displaced in a vertical plane which encompasses two diagonally opposite pulleys. The action of the hook and this dimension is a rotational one about the hook's vertical axis. The effective result of this rotation is lengthening of one cable (the one perpendicular to the direction of motion) and shortening of the other cable. A uniform cable tension throughout the sling is also made possible. Also in the configuration shown which was tested, the square formed by the four hard points A, B, C and D had equal sides of approximately eighty-three inches and the hook was positioned approximately thirty-four inches below the plane in which the hard points were located when the hook was in its neutral or zero swing position.

Feedback forces are generated by load oscillations caused by gusty wind conditions or the load is aerodynamically unstable in forward flight. Another term can be used to describe the response of this sling and that is "decouple." The term refers to a reduction of the feedback force acting through a compound pendulum.

It is to be understood that the invention is not limited to the specific description above or other specific figures, but may be used in other ways without depatrture from its spirit as defined by the following claims.

I claim:

1. Means for handling a load beneath a carrier, said means comprising four structurally rigid points fixed with respect to said carrier, a pulley universally connected to each rigid point, a load contacting member located below said pulleys adapted to support a load, cable means extending from said load contacting member over one pair of opposed pulleys and back to said load contacting member, and second cable means extending from said load contacting member over the other pair of opposed pulleys and back to said load contacting member.

2. Means for handling a load beneath a carrier, said means comprising four structurally rigid locations fixed with respect to said carrier, a pulley universally connected to each rigid location, a load contacting member located below said pulleys adapted to support a load, said four pulleys forming a square, cable means extending from said load contacting member over one pair of opposed pulleys and back to said load contacting member, and second cable means extending from said load contacting member over the other pair of opposed pulleys and back to said load contacting member.

3. Means for handling a load beneath a carrier, said means comprising four structurally rigid locations fixed with respect to said carrier, a pulley universally connected to each rigid location, a load contacting member located below said pulleys adapted to support a load, a cable having one end fixed to said load contacting member and extending over one pair of opposed pulleys and having its other end fixed to said load contacting member, and a second cable having one end fixed to said load contacting member and extending over the other pair of opposed pulleys and having its other end fixed to said load contacting member.

4. Means for handling a load beneath a carrier, said means comprising four structurally rigid locations fixed with respect to said carrier, a pulley universally connected to each rigid location, a load contacting member located below said pulleys adapted to support a load, cable means extending from said load contacting member over one pair of opposed pulleys and back to said load contacting member, and second cable means extending from said load contacting member over the other pair of opposed pulleys and back to said load contacting member, one pair of opposed pulleys being a little higher than the other pair of opposed pulleys so one cable extending between the one pair of pulleys will not rub the other cable extending between the other pair of pulleys.

5. Means for handling a load beneath a carrier, said means comprising four structurally rigid points fixed with respect to said carrier, a pulley universally connected to each rigid point, a load contacting member located below said pulleys adapted to support a load, said load contacting member having two attaching points spaced apart, cable means extending from one attaching point on said load contacting member over one pair of opposed pulleys and back to the other of said attaching points on said load contacting member, and second cable means extending from one attaching point on said load contacting member over the other pair of opposed pulleys and back to the other of said attaching points on said load contacting member.

6. Means for handling a load beneath a carrier, said means comprising four structurally rigid points fixed with respect to said carrier and forming substantially a square, a pulley universally connected to each rigid point, a load contacting member located below said pulleys adapted to support a load, said load contacting member having two attaching points spaced apart, cable means extending from one attaching point on said load contacting member over one pair of opposed pulleys and back to the other of said attaching points on said load contacting member, and second cable means extending from one attaching point on said load contacting member over the other pair of opposed pulleys and back to the other of said attaching points on said load contacting member.

7. Means for handling a load beneath a carrier, said means comprising four structurally rigid points fixed with respect to said carrier and forming substantially a square with two of said points being located closer to the forward part of the carrier and two of said points being located nearer the rearward part of the carrier, a pulley universally connected to each rigid point, a load contacting member located below said pulleys adapted to support a load, said load contacting member having two attaching points spaced apart, cable means extending from one attaching point on said load contacting member over one forward pulley and one rearward pulley at the opposing corner of the square and back to the other of said attaching points on said load contacting member, and second cable means extending from said one attaching point on said load contacting member over the other forward pulley and the other rearward pulley at the opposing corner of the square and back to the other of said attaching points on said load contacting member.

8. Means for handling a load beneath a carrier, said means comprising four structurally rigid points fixed with respect to said carrier and forming substantially a square with two of said points being located closer to the forward part of the carrier and two of said points being located nearer the rearward part of the carrier, a pulley universally connected to each rigid point, a load contacting member including a hook located below said pulleys adapted to support a load, said load contacting member having two attaching points spaced apart, one attaching point being located adjacent the open end of the hook, the other attaching point being located adjacent the closed end of the hook, cable means extending from one attaching point adjacent the open end of the hook on said load contacting member over one forward pulley and one rearward pulley at the opposing corner of the square and back to the other of said attaching points adjacent the closed end of the hook on said load contacting member, and second cable means extending from said one attaching point adjacent the open end of the hook on said load contacting member over the other forward pulley and the other rearward pulley at the opposing corner of the square and back to the other of said attaching points adjacent the closed end of the hook on said load contacting member.

9. A carrier capable of flight including hover, said carrier having pilot operated flight controls, said carrier having a body, means for handling a load beneath the body of the carrier which will keep at a minimum any adverse effect on said pilot operated flight controls, said means comprising:

(a) four structurally rigid locations fixed with respect to said carrier, (b) a pulley universally connected to each rigid location, (c) a load contacting member located below said pulleys adapted to support a load, (d) cable means extending from said load contacting member over one pair of opposed pulleys and back to said load contacting member, (e) and second cable means extending from said load contacting member over the other pair of opposed pulleys and back to said load contacting member.

10. In a helicopter, a body, a rigid member formed as a square fixedly positioned below said body, a pulley universally connected to each corner of said square member, a load contacting member located below said pulleys adapted to support a load, cable means extending from said load contacting member over one pair of diagonally positioned pulleys and back to said load contacting member, and second cable means extending from said load contacting member over the other pair of diagonally positioned pulleys and back to said load contacting member.

11. Means for handling a load beneath a carrier, the carrier being movable in a plurality of directions, said means comprising four supporting points between the carrier and the load handling means, each supporting point having means through which cable means can pass, a load contacting member adapted to support a load, a first cable means extending from said load contacting member through one pair of diagonally opposed means through which cable means can pass, and a second cable means extending from said load contacting member through the other pair of diagonally opposed means through which cable means can pass.

12. Means for handling a load beneath a carrier, said means comprising four structurally rigid points fixed with respect to said carrier, a cable support and guide means connected to each rigid point, a load contacting member located below said cable guide means adapted to support a load, cable means extending from said load contacting member over one pair of opposed cable support and guide means and back to said load contacting member, and second cable means extending from said load contacting member over the other pair of opposed cable support and guide means and back to said load contacting member.

References Cited by the Examiner

UNITED STATES PATENTS

| | | | |
|---|---|---|---|
| 2,953,330 | 9/1960 | Lysak | 244—118 |
| 3,028,130 | 4/1962 | Burton | 244—118 |
| 3,044,818 | 7/1962 | Tobey | 244—118 X |
| 3,191,983 | 6/1965 | Gaglione | 294—81 |

MILTON BUCHLER, *Primary Examiner.*

ALFRED E. CORRIGAN, *Examiner.*